(12) United States Patent
Suzuki et al.

(10) Patent No.: US 7,767,774 B2
(45) Date of Patent: Aug. 3, 2010

(54) SILYL-DIAMINE INITIATORS FOR ANIONIC POLYMERIZATION OF 1,3-BUTADIENE AND STYRENE, AND RUBBER COMPOSITIONS

(75) Inventors: Eiju Suzuki, Kodaira (JP); Yoichi Ozawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 360 days.

(21) Appl. No.: 10/599,651

(22) PCT Filed: Mar. 17, 2005

(86) PCT No.: PCT/JP2005/004810

§ 371 (c)(1),
(2), (4) Date: Jul. 13, 2007

(87) PCT Pub. No.: WO2005/097845

PCT Pub. Date: Oct. 20, 2005

(65) Prior Publication Data

US 2008/0033110 A1 Feb. 7, 2008

(30) Foreign Application Priority Data

Apr. 5, 2004 (JP) ............................. 2004-111231

(51) Int. Cl.
C08F 4/08 (2006.01)
C08F 4/10 (2006.01)
C08F 36/06 (2006.01)
C08F 36/08 (2006.01)
C08F 212/08 (2006.01)
C08F 236/10 (2006.01)

(52) U.S. Cl. ...................... 526/194; 152/450; 152/525; 252/511; 526/75; 526/217; 526/236; 526/336; 526/337; 526/340; 526/340.2; 526/346; 526/347; 526/348.6; 528/10; 528/12; 528/14; 528/21; 528/22; 528/33; 528/34; 528/38; 556/9; 556/12; 556/410; 556/412; 556/413; 564/463; 564/511

(58) Field of Classification Search ................. 526/178, 526/194, 217, 173, 180; 556/407, 410, 413, 556/424, 465
See application file for complete search history.

(56) References Cited

U.S. PATENT DOCUMENTS 7,342,070 B2 * 3/2008 Tsukimawashi et al. ..... 525/105
2004/0241251 A1 * 12/2004 Thiele et al. ................ 424/601

FOREIGN PATENT DOCUMENTS

| EP | 1980589 | * | 10/2008 |
| JP | 60-255838 | A | 12/1985 |
| JP | 61-225230 | A | 10/1986 |
| JP | 2-175705 | A | 7/1990 |
| JP | 6-206920 | A | 7/1994 |
| JP | 9-208621 | A | 8/1997 |
| JP | 09208621 | A * | 8/1997 |
| JP | 11228584 | * | 8/1999 |
| JP | 2000-204103 | A | 7/2000 |
| WO | WO 03/033545 | A2 | 4/2003 |
| WO | WO 2007034785 | * | 3/2007 |

OTHER PUBLICATIONS van Meerendonk, W.J. et al., "Chloro- and Alkyltitanium Complexes of a New Dianionic Ancillary Ligand: A Linked Amidinate-Amide", Eur J Inorg Chem, 2003, (3), 427-432.pdf.*
Gauvin, R. M. et al., "Synthesis, Characterization and Ethylene Polymerization Activity of Zironium Complexes Containing Nonsymmetric Diamido Ligands Derived from 2-Aminobenzylamine", Eur J Inorg Chem 2001(9), 2337-2346.pdf.*

* cited by examiner

Primary Examiner—Vasu Jagannathan
Assistant Examiner—Richard A Huhn
(74) Attorney, Agent, or Firm—Sughrue Mion, PLLC

(57) ABSTRACT

This invention relates to a novel polymerization initiator capable of introducing an active amino proton into a polymerization starting terminal without losing polymerization activity, and a novel modified conjugated diene polymer being excellent in the interaction with a filler and capable of improving a low heat buildup of a rubber composition, and more particularly to a polymerization initiator being a diamine compound in which one amino group is protected with a silylating agent and an active proton of the other amino group is replaced with an alkali metal or an alkaline earth metal, and a modified conjugated diene polymer which can be produced by using such a polymerization initiator and is a homopolymer of a conjugated diene compound or a copolymer of a conjugated diene compound and an aromatic vinyl compound and has a residue derived from a diamine compound at its polymerization starting terminal.

26 Claims, No Drawings

SILYL-DIAMINE INITIATORS FOR ANIONIC POLYMERIZATION OF 1,3-BUTADIENE AND STYRENE, AND RUBBER COMPOSITIONS

TECHNICAL FIELD

This invention relates to a modified conjugated diene polymer and a method of producing the same, a polymerization initiator used for this production method and a method of producing the same, and a rubber composition using such a modified conjugated diene polymer, and more particularly to a novel modified conjugated diene polymer being excellent in the interaction with a filler and capable of improving a low heat buildup of a rubber composition.

RELATED ART

Recently, it is strongly demanded to reduce a fuel consumption of an automobile accompanied with the rise of interests on the environmental problems. In order to cope with such a demand, it is demanded to reduce the rolling resistance as a tire performance. As a means for reducing the rolling resistance of the tire, there has hitherto been examined a method of optimizing the tire structure, but it is most generally attempted to use a rubber composition having a low heat buildup as a rubber composition applied to the tire at the present.

In order to obtain the rubber composition having a low heat buildup, it is effective to enhance the dispersibility of a filler in the rubber composition, and it is very effective to use a modified conjugated diene polymer, which is formed by introducing a functional group capable of interacting with the filler into a polymerization active site of a conjugated diene polymer having a polymerization active terminal, as a rubber component of the rubber composition.

Also, it is known that the performances of the rubber composition on a wet road surface can be largely improved by using an inorganic filler such as silica or the like together with carbon black as the filler. For this end, the amount of silica compounded in the rubber composition increases nowadays, and hence it is demanded to develop a modified conjugated diene polymer indicating a high interaction with not only carbon black but also the inorganic filler such as silica or the like.

As such a modified conjugated diene polymer are mentioned both terminal-modified polymers produced by using a modification initiator and a terminal modifying agent. In the both terminal modified polymers, however, there is a problem that the technical difficulty of the modification starting technique for introducing the functional group into the polymerization starting terminal is higher as compared with the terminal modification technique for utilizing the polymerization active terminal for the introduction of the functional group. For this end, the existing modification initiators are critical in a point of molecule design, and there is a rare case satisfying the desired performances. Particularly, there is no modification initiator developing sufficient performances for silica at the present time.

For example, there is known a technique using an organotin lithium as an initiator. However, the rubber composition using the modified conjugated diene polymer obtained by this technique develops an excellent effect when carbon black is used as the filler, but is less in the effect when silica is used as the filler.

There is also known a technique using an initiator obtained by acting an organic alkali metal compound to a dialkylamine compound or a dialkylamino-substituted styrene compound. However, the rubber composition using the modified conjugated diene polymer obtained by this technique somewhat develops the effect when silica is used as the filler, but the effect when carbon black is used as the filler is fairly poor as compared with the rubber composition using the modified conjugated diene polymer obtained by using the organotin lithium as the initiator.

Further, there is a method using an ether compound, but the sufficiently high interaction to both of carbon black and silica can not be desired.

On the other hand, it is known that a modified conjugated diene polymer having a primary or secondary amino group provided at a terminal with an active amino proton through a technique on a terminal modifying agent such as 1,3-dimethylimidazolidinone, aminoalkoxy silane or the like indicates an excellent interaction to both of carbon black and silica (see JP-B-H06-18801).

As the technique of introducing the functional group into the polymerization starting terminal is known a method of replacing a secondary amino proton of piperidine with lithium for use in the polymerization reaction. In this method, the secondary amino proton is converted into a polymerization active point, so that the active amino proton is not existent in the resulting polymer (see JP-A-H06-211915, JP-A-H08-225604 and JP-A-H08-231658). On the other hand, a high-order associated body is formed in the simple replacement with lithium on a diamine compound such as piperazine or the like to produce only an insoluble solid, which does not indicate the polymerization activity. Therefore, there is not known a modification initiator capable of introducing an active amino proton into a polymerization starting terminal without losing the polymerization activity.

DISCLOSURE OF THE INVENTION

It is, therefore, an object of the invention to solve the above problems of the conventional techniques and to provide a novel polymerization initiator capable of introducing the active amino proton into the polymerization starting terminal without losing the polymerization activity. It is another object of the invention to provide a novel modified conjugated diene polymer produced by using such a polymerization initiator and being excellent in the interaction with a filler and capable of improving a low heat buildup of a rubber composition. Further, it is the other object of the invention to provide a method of producing the above modified conjugated diene polymer and polymerization initiator. Moreover, it is a still further object of the invention to provide a rubber composition including the above modified conjugated diene polymer and having an excellent low heat buildup.

The inventors have made various studies in order to achieve the above objects and found that a conjugated diene compound and an aromatic vinyl compound can be polymerized without losing the polymerization activity by protecting one amine of a diamine compound having two amino groups with an active amino proton with a silylating agent and thereafter adding an organolithium compound or the like and using as a polymerization initiator the aforementioned polymerization initiator and further the active amino proton can be introduced into a polymerization starting terminal of the polymer, and as a result, the invention has been accomplished.

That is, the modified conjugated diene polymer according to the invention is a homopolymer of a conjugated diene compound or a copolymer of a conjugated diene compound and an aromatic vinyl compound, and is characterized by the following formula (I):

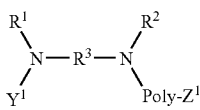

(wherein $R^1$ and $R^2$ are independently an alkyl or aryl group having a carbon number of 1-20, a substituted silyl group or a hydrogen atom; $R^3$ is an alkylene or arylene group having a carbon number of 1-12 provided that it may include a hetero atom unless it has not an active proton; $Y^1$ is a substituted silyl group or a hydrogen atom; a part of $R^1$, $R^2$, $R^3$ and $Y^1$ may be bonded to each other to form a cyclic structure; Poly is a homopolymer part of a conjugated diene compound or a copolymer portion of a conjugated diene compound and an aromatic vinyl compound; $Z^1$ is an alkali metal or an alkaline earth metal, or a residue produced by reacting with a carbanion reactive compound, or a hydrogen atom). In the formula (I), $R^2$ is preferable to be an alkyl or aryl group having a carbon number of 1-20.

In a preferable embodiment of the modified conjugated diene polymer according to the invention, the conjugated diene compound is 1,3-butadiene or isoprene, and the aromatic vinyl compound is styrene. Moreover, the modified conjugated diene polymer according to the invention is preferable to be a copolymer of the above conjugated diene compound and the above aromatic vinyl compound.

The modified conjugated diene polymer according to the invention is preferable to have a Mooney viscosity $ML_{1+4}$ (100° C.) of 10-150.

In the modified conjugated diene polymer according to the invention, it is preferable that the modified conjugated diene polymer wherein $Z^1$ in the formula (1) is an alkali metal or an alkaline earth metal is modified with a carbanion reactive compound. In this case, $Z^1$ in the formula (I) is a residue produced by reacting with the carbanion reactive compound. As the carbonion reactive compound used in the modification are preferable a compound including at least one of C=X (X is O, S or C) and an epoxy group as a carbanion reaction site and a nitrogen-containing functional group, a silicon-containing compound, and a tin-containing compound.

As the compound including at least one of C=X and an epoxy group as a carbanion reaction site and a nitrogen-containing functional group are preferable 4-dimethylamino benzophenone, 4-diethylamino benzophenone, 4,4'-bis(dimethylamino)benzophenone, 4,4'-bis(diethylamino)benzophenone, 4-dimethylamino benzaldehyde, 4-diethylamino benzaldehyde, 1,1-bis(4-dimethylaminophenyl)ethylene, 1,1-bis(4-diethylaminophenyl)ethylene, 1,1-dimethoxy trimethylamine, 4-dimethylaminobenzylidene aniline, N,N-dimethylformamide, N,N-diethylformamide, N,N-dimethylacetamide, N,N-diethylacetamide, 4-pyridylamide, 4-pyridyl-ethyleneoxide, 4-vinylpyridine, 2-vinylpyridine, dicyclohexyl carbodiimide, ε-caprolactam, N-methyl-ε-caprolactam, 1,3-dimethyl-2-imidazolidinone, N-methylpyrrolidone, phenylisocyanate, phenylthioisocyanate and diisocyanate diphenylmethane. Further, 4,4'-bis(dimethylamino) benzophenone, 4-vinylpyridine and 1,3-dimethyl-2-imidazolidinone are preferable.

As the silicon-containing compound and the tin-containing compound used in the modification is preferable a coupling agent represented by the following formula (II):

$$R^4{}_a Z^2 X^1{}_b \quad \text{(II)}$$

(wherein $R^4$ is independently selected from an alkyl group having a carbon number of 1-20, a cycloalkyl group having a carbon number of 3-20, an aryl group having a carbon number of 6-20 and an aralkyl group having a carbon number of 7-20; $Z^2$ is tin or silicon atom; $X^1$ is independently chlorine or bromine atom; and a is an integer of 0-3 and b is an integer of 1-4 provided that a+b=4).

As the silicon-containing compound used in the modification are preferable a hydrocarbyloxysilane compound represented by the following formula (III):

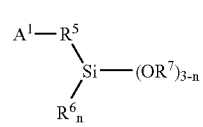

[wherein $A^1$ is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid, carbonic acid dihydrocarbylester, cyclic tertiary amine, non-cyclic tertiary amine, nitrile, pyridine, sulfide, multi-sulfide, an alkali metal salt of amine, al alkaline earth metal salt of amine, silazane and disilazane; $R^5$ is a single bond or a divalent inactive hydrocarbon group; $R^6$ and $R^7$ are independently a monovalent aliphatic hydrocarbon group having a carbon number of 1-20 or a monovalent aromatic hydrocarbon group having a carbon number of 6-18; n is an integer of 0-2; when plural $OR^7$s are existent, these $OR^7$s may be same or different; active proton and onium salt is not included in the molecule] and a partial condensate thereof, and a hydrocarbyloxysilane compound represented by the following formula (IV): $R^8{}_p\text{—Si—}(OR^9)_{4-p}$, . . . (IV) (wherein $R^8$ and $R^9$ are independently a monovalent aliphatic hydrocarbon group having a carbon number of 1-20 or a monovalent aromatic hydrocarbon group having a carbon number of 6-18; p is an integer of 0-2; when plural $OR^9$s are existent, these $OR^9$s may be same or different; active proton and onium salt is not included in the molecule) and a partial condensate thereof.

As the modified conjugated diene polymer according to the invention is preferable a modified conjugated diene polymer formed by further modifying the modified conjugated diene polymer wherein $Y^1$ in the formula (I) is a hydrogen atom with at least one of a compound having an isocyanate group and a condensate thereof.

Also, the polymerization initiator according to the invention is characterized by the following formula (V):

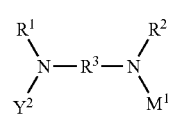

(wherein $R^1$, $R^2$ and $R^3$ are the same meaning as mentioned above; $Y^2$ is a substituted silyl group; a part of $R^1$, $R^2$, $R^3$ and $Y^2$ may be bonded to each other to form a cyclic structure; $M^1$ is an alkali metal or an alkaline earth metal).

Furthermore, the production method of the polymerization initiator according to the invention can use the generally known silylation conditions. That is, the method of producing the polymerization initiator according to the invention is characterized in that (i) a diamine compound represented by the following formula (VI):

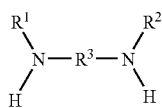

(VI)

(wherein $R^1$ and $R^2$ are independently an alkyl or aryl group having a carbon number of 1-20 or a hydrogen atom; $R^3$ is the same meaning as mentioned above; a part of $R^1$, $R^2$ and $R^3$ may be bonded to each other to form a cyclic structure) is added with a silyl compound preferably represented by the following formula (VII):

$$Y^2-X^2 \qquad (VII)$$

(wherein $Y^2$ is the same meaning as mentioned above; $X^2$ is one selected from a halogen atom, a thioalkyl group having a carbon number of 1-20, cyano group and trifluoromethylsulfonyl group, preferably a halogen atom) to form a silylated diamine compound represented by the following formula (VIII):

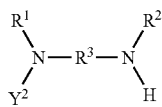

(VIII)

(wherein $R^1$, $R^2$, $R^3$ and $Y^2$ are the same meaning as mentioned above; a part of $R^1$, $R^2$, $R^3$ and $Y^2$ may be bonded to each other to form a cyclic structure);

(ii) the said silylated diamine compound is added with an organic alkali metal compound or an organic alkaline earth metal compound to form a polymerization initiator represented by the formula (V). Moreover, in the formation of the polymerization initiator of the formula (V), the silylated diamine compound of the formula (VIII) may be used after the purification by a proper method, or a crude reaction product solution of the silylated diamine compound of the formula (VIII) may be used as it is.

Also, a first production method of the modified conjugated diene polymer according to the invention is characterized in that (i) the diamine compound of the formula (VI) is added with the silyl compound of the formula (VII) to form a silylated diamine compound of the formula (VIII);

(ii) the silylated diamine compound is added with the organic alkali metal compound or the organic alkaline earth metal compound to form the polymerization initiator of the formula (V); and (iii) the polymerization initiator is used to polymerize a conjugated diene compound or polymerize a conjugated diene compound and aromatic vinyl compound. Moreover, in the formation of the polymerization initiator of the formula (V), the silylated diamine compound of the formula (VIII) may be used after the purification by a proper method, or a crude reaction product solution of the silylated diamine compound of the formula (VIII) may be used as it is.

A second production method of the modified conjugated diene polymer according to the invention is characterized in that (i) the diamine compound of the formula (VI) is added with the silyl compound of the formula (VII) to form a silylated diamine compound of the formula (VIII);

(ii) the silylated diamine compound is added with the organic alkali metal compound or the organic alkaline earth metal compound to form the polymerization initiator of the formula (V);

(iii) the polymerization initiator is added to a solution containing a conjugated diene compound to produce a low molecular weight polymer represented by the following formula (IX):

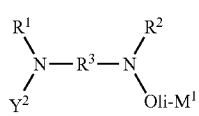

(IX)

(wherein $R^1$, $R^2$, $R^3$, $Y^2$ and $M^1$ are the same meaning as mentioned above; a part of $R^1$, $R^2$, $R^3$ and $Y^2$ may be bonded to each other to form a cyclic structure; Oli is an oligomer or polymer portion formed by polymerizing 3-300 conjugated diene compounds); and (iv) the low molecular weight polymer is added to a solution containing a conjugated diene compound or a solution containing a conjugated diene compound and an aromatic vinyl compound. In the formation of the polymerization initiator of the formula (V), the silylated diamine compound of the formula (VIII) may be used after the purification by a proper method, or a crude reaction product solution of the silylated diamine compound of the formula (VIII) may be used as it is.

A third method of producing the modified conjugated diene polymer according to the invention is characterized in that (i) the diamine compound of the formula (VI) is added with the silyl compound of the formula (VII) to form a silylated diamine compound of the formula (VIII);

(ii) the silylated diamine compound is added to a solution containing a conjugated diene compound or a solution containing a conjugated diene compound and an aromatic vinyl compound; and (iii) the said solution is further added with an organic alkali metal compound or an organic alkaline earth metal compound.

Furthermore, the rubber composition according to the invention is characterized by including the aforementioned modified conjugated diene polymer.

In a preferable embodiment of the rubber composition according to the invention, the content of the modified conjugated diene polymer is not less than 10% by mass in a rubber component.

Also, the rubber composition is preferable to be sulfur-crosslinking.

The rubber composition according to the invention is preferable to be compounded 10-100 parts by mass in total of carbon black and/or an inorganic filler per 100 parts by mass of the rubber component. At this moment, the rubber composition is further preferable to be compounded 10-100 parts by mass of silica as the inorganic filler per 100 parts by mass of the rubber component.

According to the invention, there can be provided a novel polymerization initiator produced by protecting one amine of the diamine compound having in its molecule two amino groups with active amino proton with a silylating agent and then adding with an organic alkali metal compound or an organic alkaline earth metal compound and capable of polymerizing a conjugated diene compound and an aromatic vinyl compound without losing the polymerization activity and further introducing the active amino proton into a polymerization starting terminal of the polymer. Also, there can be provided a novel modified conjugated diene polymer produced by using such a polymerization initiator and capable of having active amino proton in a polymerization starting terminal of the polymer. Furthermore, there can be provided a method of producing the above polymerization initiator and modified conjugated diene polymer as well as a rubber composition including the above modified conjugated diene polymer and having an excellent low heat buildup.

BEST MODE FOR CARRYING OUT THE INVENTION

Modified Conjugated Diene Polymer

The modified conjugated diene polymer according to the invention is described in detail below. The modified conjugated diene polymer according to the invention is a homopolymer of a conjugated diene compound or a copolymer of a conjugated diene compound and an aromatic vinyl compound, and is represented by the formula (I). The modified conjugated diene polymer of the formula (I) has at least two nitrogen atoms in its molecule and is excellent in the interaction with a filler, and when such a modified conjugated diene polymer is used as a rubber component of a rubber composition, the low heat buildup of the rubber composition can be improved, and also when such a rubber composition is used in a tire, the rolling resistance of the tire can be reduced. Also, the modified conjugated diene polymer wherein $Z^1$ in the formula (I) is an alkali metal or an alkaline earth metal is rendered into a both terminal-modified conjugated diene polymer by using modifying with a modifying agent as a carbanion reactive compound. The both terminal-modified conjugated diene polymer is further excellent in the interaction with the filler because not only the polymerization starting terminal but also the polymerization active terminal are modified. Furthermore, the modified conjugated diene polymer wherein Y1 in the formula (I) is a hydrogen atom particularly indicates an excellent interaction to both of carbon black and silica because it has active amino proton in its molecule.

In the formula (I), $R^1$ and $R^2$ are independently an alkyl or aryl group having a carbon number of 1-20, a substituted silyl group or a hydrogen atom, and are preferable to be an alkyl or aryl group having a carbon number of 1-20. The alkyl group may be straight, branched or cyclic, and includes, for example, methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group and the like. Also, the aryl group may have a substituent such as lower alkyl group or the like on its aromatic ring, and includes, for example, phenyl group, tolyl group, xylyl group, naphthyl group and the like. Further, as the substituted silyl group are preferable a trialkylsilyl group such as trimethylsilyl group, triethylsilyl group, methyldiethylsilyl group, dimethylethylsilyl group, triisopropylsilyl group, dimethylisopropylsilyl group, diethylisopropylsilyl group, t-butyldimethylsilyl group or the like, triphenylsilyl group, t-butyldiphenylsilyl group and the like. $R^1$ and $R^2$ may be same or different.

In the formula (I), $R^3$ is an alkylene or arylene group having a carbon number of 1-12, but may contain a hetero atom unless it has not active proton. The alkylene group may be straight, branched or cyclic, but is particularly preferable to be straight. As the straight alkylene group are mentioned methylene group, ethylene group, trimethylene group, tetramethylene group, pentamethylene group, hexamethylene group, octamethylene group, decamethylene group, dodecamethylene group and the like. Also, the arylene group may have a substituent such as lower alkyl group or the like on its aromatic ring, and includes, for example, phenylene group, xylylene group, naphthylene group and the like. Moreover, as the hetero atom are mentioned O, S, P and the like.

In the formula (I), $Y^1$ is a substituted silyl group or a hydrogen atom. As the substituted silyl group is preferable a trialkylsilyl group such as trimethylsilyl group, triethylsilyl group, methyldiethylsilyl group, dimethylethylsilyl group or the like, and trimethylsilyl group is particularly preferable. When $Y^1$ in the formula (I) is a hydrogen atom, the modified conjugated diene polymer of the formula (I) has an active amino proton in its polymerization starting terminal and is excellent in the interaction to carbon black and silica.

In the formula (I), a part of $R^1$, $R^2$, $R^3$ and $Y^1$ may be bonded to each other to form a cyclic structure. Also, Poly in the formula (I) is a homopolymer portion of a conjugated diene compound or a copolymer portion of a conjugated diene compound and aromatic vinyl compound.

In the formula (I), Z1 is an alkali metal or an alkaline earth metal, a residue produced by reacting with a carbanion reactive compound, or a hydrogen atom. As the alkali metal are mentioned lithium, sodium, potassium and the like, and as the alkaline earth metal are mentioned magnesium, calcium and the like. As the carbanion reactive compound are mentioned a short-stop, a modifying agent and the like. As the short-stop is preferable water or a compound containing an active proton such as an alcohol compound or the like, in which the resulting residue is a hydrogen atom. Moreover, the case of using the modifying agent as the carbanion reactive compound will be described later.

The modified conjugated diene polymer according to the invention is preferable to a Mooney viscosity $ML_{1+4}(100°\ C.)$ of 10-150. When the Mooney viscosity $ML_{1+4}(100°\ C.)$ of the modified conjugated diene polymer is less than 10, the dynamic characteristics of the rubber composition including the modified conjugated diene polymer such as fracture properties and the like become insufficient, while when it exceeds 150, the workability in the milling of the modified conjugated diene polymer with various additives such as filler and the like is considerably deteriorated.

Also, the modified conjugated diene polymer according to the invention is preferable to have a number average molecular weight (Mn) of 50,000-500,000. When the number average molecular weight of the modified conjugated diene polymer is less than 50,000, the fracture properties and wear resistance after the vulcanization of the rubber composition including the modified conjugated diene polymer are deteriorated, while when it exceeds 500,000, the workability of the rubber composition including the modified conjugated diene polymer is deteriorated and the milling is difficult.

<Polymerization Initiator>

The polymerization initiator according to the invention suitable for the production of the modified conjugated diene polymer is represented by the formula (V). As the technique of introducing the functional group into the polymerization starting terminal is known a method of replacing a secondary amino proton of piperidine with lithium as previously mentioned, but in this method, the secondary amino proton is converted into a polymerization active point, so that the active amino proton is not existent in the resulting polymer. On the other hand, even in the simple replacement with lithium on the the diamine compound such as piperazine or the like, a high-order associated body is formed to produce only an insoluble solid, which does not indicate the polymerization activity. On the contrary, in the polymerization initiator according to the invention, for the purpose of obstructing the formation of the associated body between the initiators and improving the solubility into the hydrocarbon solvent accompanied with the lowering of the molecule polarity, the silylating agent is acted to one amino group in the diamine compound having active amino proton to protect such an active amino group and thereafter the other active amino proton is treated with a proper organic alkali metal compound or organic alkaline metal compound, so that the sufficient polymerization activity can be developed. Also, Si—N bond is existent in the polymer produced by using such a polymerization initiator, but it is rapidly hydrolyzed after the stop of the polymerization, so that it is possible to easily reproduce such a bond as an active amino group and there can be easily obtained a target modified conjugated diene polymer having an active amino group in its polymerization starting terminal.

In the polymerization initiator of the formula (V), $R^1$, $R^2$ and $R^3$ are the same as $R^1$, $R^2$ and $R^3$ in the formula (I). Also, $Y^2$ is a substituted silyl group, which is the same as the substituted silyl group described on $Y^1$ in the formula (I), while $M^1$ is an alkali metal or an alkaline earth metal, which is the same as the alkali metal or alkaline earth metal described on $Z^1$ in the formula (I). Further, a part of $R^1$, $R^2$, $R^3$ and $Y^2$ in the formula (V) may be bonded to each other to form a cyclic structure.

<Production Method of Polymerization Initiator>

As the method of producing the above polymerization initiator is preferable a method wherein the diamine compound of the formula (VI) is added with the silyl compound of the formula (VII) to form the silylated diamine compound of the formula (VIII) (first step) and the silylated diamine compound is added with the organic alkali metal compound or the alkaline earth meta compound to form the polymerization initiator of the formula (V) (second step). However, the polymerization initiator may be formed in the polymerization reaction system.

In the diamine compound of the formula (VI), $R^1$ and $R^2$ are independently an alkyl or aryl group having a carbon number of 1-20 or a hydrogen atom, and $R^3$ is the same as mentioned in the formula (I), and a part of $R^1$, $R^2$ and $R^3$ may be bonded to each other to form a cyclic structure. Moreover, the alkyl or aryl group having a carbon number of 1-20 in $R^1$ and $R^2$ of the formula (VI) is the same as mentioned in the formula (I). As the diamine compound of the formula (VI) are concretely mentioned N,N'-dimethyl-1,2-diaminoethane, N,N'-dimethyl-1,3-diaminopropane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, imidazolidine, pirazolidine, piperazine, 1,2-bis(4-piperidyl)ethane, 1,3-bis(4-piperidyl)propane, 1,4-bis(4-piperidyl)butane, ethylenediamine, 1,3-diaminopropane, 1,4-diaminobutane, 1,4-diaminopentane, 1,4-diaminohexane, N-methylethylenediamine, N-ethylethylenediamine, N-isopropylethylenediamine, N-propylethylenediamine, N-butylethylenediamine, N-methyl-1,3-propane diamine, N-ethyl-1,3-propane diamine, N-propyl-1,3-propane diamine, N-isopropyl-1,3-propane diamine, 1-(2-aminoethyl)piperazine and the like.

The silyl compound of the formula (VII) is a silylating agent for protecting one active amino group in the above diamine compound, wherein $Y^2$ in the formula (VII) is the same as $Y^2$ of the formula (V) and $X^2$ in the formula (VII) is one selected from a halogen atom, a thioalkyl group having a carbon number of 1-20 (—SR: R is an alkyl group), a cyano group (—C≡N) and a trifluoromethylsulfonyl group (—OSO$_2$CF$_3$), preferably a halogen atom, and as the halogen atom is mentioned a chlorine atom, a bromine atom and the like. Among them, a chlorine atom is preferable. As the silyl compound of the formula (VII) are concretely mentioned a chlorotrialkyl silane such as chlorotrimethyl silane, chlorotriethyl silane, chloromethyldiethyl silane, chlorodimethylethyl silane, chlorotriisopropyl silane, chlorodimethylisopropyl silane, diethylisopropylsilyl chloride, t-butyldimethylsilyl chloride or the like; 1,2-bis(chlorodimethylsilyl)ethane, chlorotriphenyl silane, t-butyldiphenylsilyl chloride. Among them, chlorotrimethyl silane is particularly preferable.

Also, the organic alkali metal compound and the organic alkaline earth metal compound are organic metallic compounds of the above alkali metal and alkaline earth metal. Among them, an organolithium compound is preferable. As the organolithium compound are mentioned ethyllithium, n-propyllithium, isopropyllithium, n-butyllithium, sec-butylliyhium, tert-octyllithium, n-decyllithium, phenyllithium, 2-naphthyllithium, 2-butyl-phenyllithium, 4-phenyl-butyllithium, cyclohexyllithium, cyclopentyllithium and the like. Among them, an alkyllithium such as ethyllithium, n-propyllithium, isopropyllithium, n-butyllithium, sec-butyllithium, tert-octyllithium, n-decyllithium or the like is preferable, and n-butyllithium is particularly preferable.

In the first step of the production method of the polymerization initiator, the diamine compound of the formula (VI) is added with the silyl compound of the formula (VII) to form the silylated diamine compound of the formula (VIII). $R^1$, $R^2$ and $R^3$ in the formula (VIII) are the same as mentioned in the formula (I), and $Y^2$ in the formula (VIII) is the same as $Y^2$ of the formula (V), and a part of $R^1$, $R^2$, $R^3$ and $Y^2$ may be bonded to each other to form a cyclic structure. At this moment, it is preferable to use not less than 1.0 mol of the silyl compound of the formula (VII) per 1 mol of active amino proton included in the diamine compound of the formula (VI). Also, the first step is carried out in the presence of the organic alkali metal compound or the organic alkaline earth metal compound for promoting the silylation reaction of the diamine compound of the formula (VI), in which it is preferable to use not less than 1.0 mol of the organic alkali metal compound or the organic alkaline earth metal compound per 1 mol of active amino proton included in the diamine compound of the formula (VI).

In the second step, the silylated diamine compound of the formula (VIII) is added with the aforementioned the organic alkali metal compound or the organic alkaline earth metal compound to form the polymerization initiator of the formula (V) according to the invention. Moreover, when the organic alkali metal compound or the organic alkaline earth metal compound is used in the first step, the organic alkali metal compound or the organic alkaline earth metal compound used in the second step may be the same as or different from ones used in the first step. At this moment, it is preferable to use 1.0 mol of the organic alkali metal compound or the organic alkaline earth metal compound per 1 mol of the silylated diamine compound of the formula (VIII).

The preparation of the polymerization initiator is preferable to be carried out in an atmosphere of an inert gas such as nitrogen, argon or the like at −20-80° C., and is further preferable to be carried out at room temperature. Also, the preparation of the polymerization initiator is preferable to be carried out in a solvent, and as the solvent are mentioned a hydrocarbon solvent such as n-hexane, cyclohexane, benzene, toluene or the like, and an ether solvent such as diethyl ether, tetrahydrofuran or the like.

<Production Method of Modified Conjugated Diene Polymer>

As the production method of the modified conjugated diene polymer according to the invention, there are mentioned a first method wherein the polymerization initiator is previously prepared and then used, a second method wherein a small amount of a conjugated diene compound is added to the previously prepared polymerization initiator to conduct small polymerization and then used, and a third method wherein the polymerization initiator is prepared and used in a polymerization system (in situ). Moreover, the amount of the polymerization initiator used is preferable to be a range of 0.2-20 mmol per 100 g of a monomer.

In the second method, the polymerization initiator prepared as previously mentioned is added to a solution including the conjugated diene compound to form a low molecular weight polymer represented by the formula (IX) in which one terminal is a residue of the diamine compound derived from the polymerization initiator and the other terminal is a polymerization active terminal, and the resulting low molecular weight polymer is added to a solution including a conjugated diene compound or a solution including a conjugated diene compound and an aromatic vinyl compound to obtain a modified conjugated diene polymer. When the polymerization initiator is added to the solution including the conjugated diene compound to form the low molecular weight polymer of the formula (IX) and the resulting low molecular weight polymer is used as a polymerization initiator, the solubility of the polymerization initiator into a polymerization solvent can be improved. Moreover, $R^1$, $R^2$ and $R^3$ in the formula (IX) are the same as mentioned in the formula (I) and $Y^2$ in the formula (IX) is the same as $Y^2$ of the formula (V), and a part of $R^1$, $R^2$, $R^3$ and $Y^2$ may be bonded to each other to form a cyclic structure. Also, $M^1$ in the formula (IX) is the same as $M^1$ of the formula (V). Furthermore, Oli in the formula (IX) is an oligomer or polymer portion polymerized from 3-300 conjugated diene compounds, which has a molecular weight smaller than Poly of the formula (I) and acts to improve the solubility of the initiator into the polymerization solvent.

In the third method, the silylated diamine compound of the formula (VIII) prepared as mentioned above is added to the solution including the conjugated diene compound or the solution including the conjugated diene compound and the aromatic vinyl compound and further the organic alkali metal compound or the organic alkaline earth metal compound is added to such a solution to obtain the modified conjugated diene polymer according to the invention. Moreover, when the organic alkali metal compound or the organic alkaline earth metal compound is used in the preparation of the silylated diamine compound, the organic alkali metal compound or the organic alkaline earth metal compound added to the polymerization reaction system may be the same as or different from one used in the preparation of the silylated diamine compound.

Moreover, the diamine compound of the formula (VI), silyl compound of the formula (VII), silylated diamine compound of the formula (VIII), organic alkali metal compound and organic alkaline earth metal compound used in the production of the modified conjugated diene polymer are as mentioned in the production of the polymerization initiator.

Since the modified conjugated diene polymer is a homopolymer of a conjugated diene compound or a copolymer of a conjugated diene compound and an aromatic vinyl compound, conjugated diene compound and aromatic vinyl compounds are mentioned as a monomer used in the production method of the modified conjugated diene polymer according to the invention. As the conjugated diene compound of the monomer are mentioned 1,3-butadiene, isoprene, 1,3-pentadiene, 2,3-dimethylbutadiene, 2-phenyl-1,3-butadiene, 1,3-hexadiene and the like. Among them, 1,3-butadiene and isoprene are preferable, and 1,3-butadiene is particularly preferable. These conjugated diene compounds may be used alone or in a combination of two or more. As the aromatic vinyl compound of the monomer are mentioned styrene, α-methylstyrene, 1-vinylnaphthalene, 3-vinyltoluene, ethylvinylbenzene, divinylbenzene, 4-cyclohexylstyrene and 2,4,6-trimethylstyrene and the like. Among them, styrene is preferable. These aromatic vinyl compounds may be used alone or in a combination of two or more. Moreover, the modified conjugated diene polymer according to the invention is preferable to be a copolymer of a conjugated diene compound and an aromatic vinyl compound, and is further preferable to be a styrene-butadiene copolymer.

The modified conjugated diene polymer may be produced by any of solution polymerization, vapor phase polymerization and bulk polymerization, but is preferable to be produced by the solution polymerization. When the modified conjugated diene polymer is produced by the solution polymerization, the conjugated diene compound alone or the mixture of the conjugated diene compound and the aromatic vinyl compound is polymerized, for example, in a hydrocarbon solvent inactive to the polymerization reaction to obtain a modified conjugated diene polymer. As the hydrocarbon solvent inactive to the polymerization reaction are mentioned propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and the like. Among them, cyclohexane is preferable. These solvents may be used alone or in a combination of two or more.

The production of the modified conjugated diene polymer according to the invention may be carried out in the presence of a randomizer. The randomizer can control the microstructure of the resulting polymer and has an action that 1,2-bond content in butadiene unit of the polymer using, for example, butadiene as a monomer is controlled or butadiene unit and styrene unit of the copolymer using styrene and butadiene as a monomer is randomized, or the like. The randomizer may be added at an arbitrary stage. As the randomizer are mentioned dimethoxybenzene, tetrahydrofuran, dimethoxyethane, diethylene glycol dibutyl ether, diethylene glycol dimethyl ether, ditetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and the like. The amount of the randomizer used is preferable to be a range of 0.01-100 mol per 1 mol of the polymerization initiator.

When the modified conjugated diene polymer is produced by the solution polymerization, the concentration of the monomer in the solution is preferably a range of 5-50% by mass, further preferably a range of 10-30% by mass. Moreover, when the conjugated diene compound and the aromatic vinyl compound are used together as a monomer, the content of the aromatic vinyl compound in the monomer mixture is preferably a range of 3-50% by mass, further preferably a range of 4-45% by mass. Also, the polymerization system is not particularly limited and may be a batch system or a continuous system.

In the production method of the modified conjugated diene polymer according to the invention, the polymerization temperature is preferably a range of 0-150° C., further preferably a range of 20-130° C. Also, the polymerization may be carried out under a generating pressure, but it is preferable to be usually conducted under a pressure enough to keep the monomer used at substantially a liquid phase. When the polymerization reaction is carried out under a pressure higher than the generating pressure, the reaction system is preferable to be pressurized with an inert gas. Further, the starting materials used in the polymerization such as monomer, polymerization initiator, solvent and the like are preferable to be used after the reaction obstructing substances such as water, oxygen, carbon dioxide, protonic compound and the like are previously removed.

<Modification with Modifying Agent>

By polymerizing the conjugated diene compound or copolymerizing the conjugated diene compound and the aromatic vinyl compound with the above polymerization initiator is obtained a living polymer having a functional group derived from the diamine compound in its polymerization starting terminal and a polymerization active terminal in its other terminal, i.e. a polymer wherein $Z^1$ of the formula (I) is an alkali metal or an alkaline earth metal. Although the polymerization active terminal is disactivated by a short-stop, it is modified with a modifying agent to obtained a both terminal-modified conjugated diene polymer. As the modifying agent can be used a carbanion reactive compound. In this case, there is obtained a polymer in which $Z^1$ of the formula (I) is a residue produced by reacting with the carbanion reactive compound.

As the carbanion reactive compound used in the modification of the polymerization active terminal are mentioned a compound including at least one of C=X and an epoxy group as a carbanion reaction site and a nitrogen-containing functional group, a silicon-containing compound, a tin-containing compound and the like. As the compound including at least one of C=X and epoxy group and the nitrogen-containing functional group are mentioned 4-dimethylamino benzophenone, 4-diethylamino benzophenone, 4,4'-bis(dimethylamino)benzophenone, 4,4'-bis(diethylamino)benzophenone, 4-dimethylamino benzaldehyde, 4-diethylamino benzaldahyde, 1,1-bis(4-dimethylaminophenyl)ethylene, 1,1-bis(4-diethylaminophenyl)ethylene, 1,1-dimethoxy trimethylamine, 4-dimethylaminobenzilidene aniline, N,N-dimethylformamide, N,N-diethylformamide, N,N-dimethylacetamide, N,N-diethylacetamide, 4-pyridylamide, 4-pyridyl-ethyleneoxide, 4-vinylpyridine, 2-vinylpyridine, dicyclohexylcarbodiimide, ε-caprolactam, N-methyl-ε-caprolactam, 1,3-dimethyl-2-imidazolidinone, N-methylpyrrolidone, phenylisocyanate, phenylthioisocyanate, diisocyanate phenylmethane and the like. Among them, 4,4'-bis(dimethylamino)benzophenone, 4-vinylpyridine and 1,3-dimethyl-2-imidazolidinone are preferable.

As the silicon-containing compound and tin-containing compound as the modifying agent are preferable the coupling agents represented by the formula (II). The conjugated diene polymer modified with the coupling agent of the formula (II) has at least one tin-carbon bond or silicon-carbon bond. In the formula (II), $R^4$ is independently an alkyl group having a carbon number of 1-20, a cycloalkyl group having a carbon number of 3-20, an aryl group having a carbon number of 6-20 or an aralkyl group having a carbon number of 7-20 and includes concretely methyl group, ethyl group, n-butyl group, neophyl group, cyclohexyl group, n-octyl group, 2-ethylhexyl group and the like. Also, $Z^2$ is tin or silicon, and $X^1$ is independently chlorine or bromine, and a is an integer of 0-3, and b is an integer of 1-4, provided that a+b=4. As the coupling agent of the formula (II) are preferable tin teterachloride, $R^4SnCl_3$, $R^4{}_2SnCl_2$, $R^4{}_3SnCl$ and the like, and tin teterachloride is particularly preferable.

As the silicon-containing compound as the modifying agent are also preferable a hydrocarbyloxy silane compound of the formula (III), a hydrocarbyloxy silane compound of the formula (IV) and a partial condensate thereof.

In the functional group of $A^1$ of the formula (III), imine includes ketimine, aldimine and amidine, and (thio)carboxylic acid ester includes an ester of an unsaturated carboxylic acid such as acrylate, methacrylate or the like, and non-cyclic tertiary amine includes N.N-disubstituted aromatic amine such as N.N-disubstituted aniline or the like, and cyclic tertiary amine can include (thio)ether as a part of a ring. As a metal of a metal salt of (thio)carboxylic acid can be mentioned an alkali metal, an alkaline earth metal, Al, Sn, Zn and the like. Further, the functional group in $A^1$ may be an alkali metal salt of an amine, an alkaline earth meta salt of an amine, silazane, disilazane and the like.

As the divalent inert hydrocarbon group in $R^5$ is preferable an alkylene group having a carbon number of 1-20. The alkylene group may be straight, branched or cyclic, but the straight chain is particularly preferable. As the straight alkylene group are mentioned methylene group, ethylene group, trimethylene group, tetramethylene group, pentamethylene group, hexamethylene group, octamethylene group, decamethylene group, dodecamethylene group and the like.

As $R^6$ and $R^7$ are mentioned an alkyl group having a carbon number of 1-20, an alkenyl group having a carbon number of 2-20, an aryl group having Arbor number of 6-18, an aralkyl group having a carbon number of 7-18 and the like. In this case, the alkyl group and alkenyl group may be straight, branched or cyclic, and include, for example, methyl group, ethyl group, n-propyl group, isopropyl group, n-butyl group, isobutyl group, sec-butyl group, tert-butyl group, pentyl group, hexyl group, octyl group, decyl group, dodecy group, cyclopentyl group, cyclohexyl group, vinyl group, propehyl group, allyl group, hexenyl group, octenyl group, cyclopentenyl group, cyclohexenyl group and the like. Also, the aryl group may have a substituent on the aromatic ring such as lower alkyl group or the like, and includes, for example, phenyl group, tolyl group, xylyl group, naphthyl group and the like. Further, the aralkyl group may have a substituent on the aromatic ring such as lower alkyl group or the like, and includes, for example, benzyl group, phenetyl group, naphthylmethyl group and the like.

In the formula (III), n is an integer of 0-2, but 0 is preferable. Also, it is preferable that active proton and onium salt are not included in the molecule.

In the hydrocarbyloxy silane compound of the formula (III), as the hydrocarbyloxysilane compound having, for example, (thio)epoxy group may be mentioned 2-glycidoxyethyl trimethoxysilane, 2-glycidoxyethyl triethoxysilane, (2-glycidoxyethyl)methyl dimethoxysilane, 3-glycioxypropyl trimethoxysilane, 3-glycidoxypropyl triethoxysilane, (3-glycioxypropyl)methyl dimethoxysilane, 2-(3,4-epoxycyclohexyl)ethyl trimethoxysilane, 2-(3,4-epoxycyclohexyl) ethyl triethoxysilane, 2-(3,4-epoxycyclohexyl)ethyl(methyl) dimethoxysilane and ones obtained by replacing the epoxy group in these compounds with a thioepoxy group. Among them, 3-glycidoxypropyl trimethoxysilane and 3-glycidoxypropyl triethoxysilane are particularly preferable.

As the imine group-containing hydrocarbyloxy silane compound may be mentioned N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1- propaneamine as well as trimethoxysilyl compounds, methyldimethoxysilyl compounds, ethyldiethoxysilyl compounds, methyldimethoxysilyl compounds, ethyldimethoxysilyl compounds and the like corresponding to these triethoxysilyl compounds. Among them, N-(1-methylpropylidene)-3-(triethoxysilyl)-1-propaneamine and N-(1,3-dimethylbutylidene)-3-(triethoxysilyl)-1-propaneamine are particularly preferable.

As the imine(amidine) group-containing compound are mentioned 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like. Among them, N-(3-triethoxysilylpropyl)-4,5-dihydroimidazole is preferable.

As the compound having the carboxylic acid ester group are mentioned 3-methacryloyloxypropyl triethoxysilane, 3-methacryloyloxypropyl trimethoxysilane, 3-methacryloyloxypropyl methyldiethoxysilane, 3-methacryloyloxypropyl triisopropoxysilane and the like. Among them, 3-methacryloyloxypropyl trimethoxysilane is preferable.

As the isocyanate group-containing compound are mentioned 3-isocyanatopropyl trimethoxysilane, 3-isocyanatopropyl triethoxysilane, 3-isocyanatopropyl methyldiethoxysilane, 3-isocyanatopropyl triisopropoxysialne and the like. Among them, 3-isocyanatopropyl triethoxysilane is preferable.

As the compound having the carboxylic anhydride are mentioned 3-triethoxysilylpropyl succinic acid anhydride, 3-trimethoxysilylpropyl succinic acid anhydride, 3-methyldiethoxysilylpropyl succinic acid anhydride and the like. Among them, 3-triethoxysilylpropyl succinic acid anhydride is preferable.

As the hydrocarbyloxysilane compound having a cyclic tertiary amine group are mentioned 3-(1-hexamethyleneimino)propyl(triethoxy) silane, 3-(1-hexamethyleneimino) propyl(trimethoxy) silane, (1-hexamethyleneimino)methyl (trimethoxy) silane, (1-hexamethyleneimino)methyl (triethoxy) silane, 2-(1-hexamethyleneimino)ethyl (triethoxy) silane, 2-(1-hexamethyleneimino)ethyl (trimethoxy) silane, 3-(1-pyrrolidinyl)propyl(triethoxy) silane, 3-(1-pyrrolidynyl)propyl(trimethoxy) silane, 3-(1-heptamethyleneimino)propyl(triethoxy) silane, 3-(1-dodecamethyleneimino)propyl(triethoxy) silane, 3-(1-hexamethyleneimino)propyl(diethoxy) methylsilane, 3-(1-hexamethyleneimino)propyl(diethoxy) ethylsilane, 3-[10-(triethoxysilyl)decyl]-4-oxazoline and the like. Among them, 3-(1-hexamethyleneimino)propyl(triethoxy) silane and (1-hexamethyleneimino)methyl(trimethoxy) silane are preferable.

As the non-cyclic tertiary amine group-containing hyxrocarbyloxysilane compound are mentioned 3-dimethylaminopropyl(triethoxy) silane, 3-dimethylaminopropyol(trimethoxy) silane, 3-diethylaminopropyl(triethoxy) silane, 3-diethylaminopropylo(trimethoxy) silane, 2-dimethylaminoethyl(triethoxy) silane, 2-dimethylaminoethyl(trimethoxy) silane, 3-dimethylaminopropyl(diethoxy) methylsilane, 3-dibutylaminopropyl(triethoxy) silane and the like. Among them, 3-diethylaminopropyl(triethoxy) silane and 3-dimethylaminopropyl(triethoxy) silane are preferable.

As the other hydrocarbyloxysilane compound are mentioned 2-(trimethoxysilylethyl) pyridine, 2-(triethoxysilylethyl) pyridine, 2-cyanoethyltriethoxy silane and the like.

The hydrocarbyloxysilane compounds of the formula (III) may be used alone or in a combination of two or more. Also, a partial condensate of the hydrocarbyloxysilane compound may be used.

In the formula (V), R8 and R9 are the same as mentioned on R6 and R7 of the formula (III), respectively.

As the hydrocarbyloxysilane compound of the formula (IV) are mentioned, for example, tetramethoxy silane, tetraethoxy silane, tetra-n-propoxy silane, tetraisopropoxy silane, tetra-n-butoxy silane, tetraisobutoxy silane, tetra-sec-butoxy silane, tetra-tert-butoxy silane, methyltrimethoxy silane, methyltriethoxy silane, methyltripropoxy silane, methyltriisopropoxy silane, ethyltrimethoxy silane, ethyltriethoxy silane, propyltriethoxy silane, butyltrimethoxy silane, phenyltrimethoxy silane, phenyltriethoxy silane, dimethyldimethoxy silane, methylphenyldimethoxy silane, vinyltrimethoxy silane, vinyltriethoxy silane, divinyldimethoxy silane, divinyldiethoxy silane and the like. Among them, tetraethoxy silane is particularly preferable.

The hydrocarbyloxysilane compounds of the formula (IV) may be used alone or in a combination of two or more. Also, a partial condensate of the hydrocarbyloxysialne compound may be used.

The modification reaction of the polymerization active terminal with the above modifying agent is preferable to be carried out by a solution reaction. In such a solution may be included a monomer used in the polymerization. Also, the reaction system of the modification reaction is not particularly limited and may be a batch system or a continuous system. Further, the reaction temperature of the modification reaction is not particularly limited as far as the reaction proceeds, and the reaction temperature in the polymerization reaction may be adopted as it is.

Also, the modified conjugated diene polymer according to the invention may be further modified on an active amino group of a polymerization starting side with at least one isocyanate compound selected from the group consisting of compounds having an isocyanate group and a condensate thereof. The modification reaction of the polymerization starting terminal with the isocyanate compound is preferable to be carried out through a solution reaction, in which the monomer used in the polymerization may be included in such a solution. Moreover, it is preferable that a compound having an active proton is not incorporated into the reaction solution other than the polymer having the active amino group. Also, since the side of the polymerization active terminal is inert to the isocyanate group, Z1 is preferable to be a residue produced by reacting with the carbanion reactive compound such as a short-stop, a modifying agent or the like. Furthermore, the reaction system of the modification reaction at the side of the polymerization starting terminal is not particularly limited, and may be a batch system or a continuous system. In addition, the reaction temperature of the modification reaction is not particularly limited as far as the reaction proceeds, and the reaction temperature in the polymerization reaction may be adopted as it is.

<Rubber Composition>

The rubber composition according to the invention comprises the aforementioned modified conjugated diene polymer as a rubber component. In this case, the content of the modified conjugated diene polymer in the rubber component is preferable to be not less than 10% by mass. When the content of the modified conjugated diene polymer in the rubber component is less than 10% by mass, the effect of improving the dispersibility of the filler is small and also the effect of improving the low heat buildup of the rubber composition is small. In the rubber composition according to the invention, natural rubber (NR), non-modified styrene-butadiene copolymer (SBR), polybutadiene rubber (BR), polyisoprene rubber (IR), butyl rubber (IIR), ethylene-propylene copolymer and the like may be used as a rubber component other than the modified conjugated diene polymer. Among them, natural rubber is preferable. These rubber components may be used alone or in a blend of two or more.

The rubber composition according to the invention is preferable to contain sulfur as a vulcanizing agent. In this case, the rubber composition is sulfur-crosslinkable. By crosslinking the rubber composition with sulfur can be given a strength suitable for use in rubber articles such as tire, belt and the like to the rubber composition.

In the rubber composition according to the invention, it is preferable that carbon black and/or an inorganic filler is compounded in a total amount of 10-100 parts by mass per 100 parts by mass of the rubber component as a filler. When the amount of carbon black and inorganic filler compounded per 100 parts by mass of the rubber component is less than 10 parts by mass in total, the fracture properties and wear resistance of the rubber composition are deteriorated, while when it exceeds 100 parts by mass, the workability of the rubber composition is deteriorated. As the carbon black, FEF, SRF, HAF, ISAF and SAF grades are preferable, and HAF, ISAF and SAF grades are further preferable.

As the inorganic filler are mentioned silica and an inorganic compound represented by the following formula (X):

$wM^2 \cdot xSiO_y \cdot zH_2O$ (X)

(wherein M2 is a metal selected from the group consisting of aluminum, magnesium, titanium, calcium and zirconium, an oxide or hydroxide of such a metal, a hydrate thereof or at least one selected from carbonates of these metals; w, x, y and z are an integer of 1-5, an integer of 0-10, an integer of 2-5 and an integer of 0-10, respectively). Moreover, when x and z are 0 in the formula (X), the inorganic compound is at least one metal selected from aluminum, magnesium, titanium, calcium and zirconium, or a metal oxide or a metal hydroxide.

As the inorganic compound of the formula (X) are mentioned alumina ($Al_2O_3$) such as γ-alumina, α-alumina or the like; alumina monohydrate ($Al_2O_3 \cdot H_2O$) such as boehmite, diaspore or the like; aluminum hydroxide [$Al(OH)_3$] such as gibbsite, bayerite or the like; aluminum carbonate [$Al_2(CO_3)_3$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titnium black ($TiO_{2n-1}$), calcium oxide (CaO), calcium hydroxide [$Ca(OH)_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 \cdot 5H_2O$ and the like), magnesium silicate ($Mg_2SiO_4$, $MgSiO_3$ and the like), calcium silicate ($Ca_2SiO_4$ and the like), aluminum silicate ($Al_2O_3 \cdot CaO \cdot 2SiO_2$ and the like), magnesium calcium silicate ($CaMgSiO_4$), calcium carbonate ($CaCO_3$), zirconium oxide ($ZrO_2$), zirconium hydroxide [$ZrO(OH)_2 \cdot nH2O$], zirconium carbonate [$Zr(CO_3)_2$], crystalline aluminosilicate including a hydrogen, an alkali metal or analkaline earth metal correcting electron charges such as various zeolites and the like.

Among the above inorganic fillers, silica is particularly preferable. By compounding silica as the filler can be improved the performances of the rubber composition on a wet road surface. As the silica are preferable wet silica, dry silica and the like, and the wet silica is further preferable. The amount of silica compounded is preferable to be a range of 10-100 parts by mass per 100 parts by mass of the rubber component. When the amount of silica compounded per 100 parts by mass of the rubber component is less than 10 parts by mass, the fracture properties and wear resistance of the rubber composition are deteriorated, while when it exceeds 100 parts by mass, the workability of the rubber composition is deteriorated.

In addition to the above rubber component, the crosslinking agent such as sulfur or the like and the filler such as carbon black, silica or the like, the rubber composition according to the invention may be properly compounded with additives usually used in the rubber industry such as an antioxidant, a softening agent, a silane coupling agent, a vulcanization accelerator, an accelerator activator and the like within a scope not damaging the object of the invention. As the additives, commercially available ones can be preferably used. The rubber composition according to the invention can be produced by compounding the rubber component including at least the modified conjugated diene polymer with various additives properly selected, if necessary and then milling, warming, extruding them.

The rubber composition according to the invention can be used in rubber articles such as tire, belt and the like. Among them, the rubber composition according to the invention is suitable for various rubber members in the tire, and is particularly suitable as a tire tread.

EXAMPLES

The following examples are given in illustration of the invention and are not intended as limitation thereof.

Production Example 1

Preparation of Polymerization Initiator Solution A

In a Kjeldahl flask of 100 mL provided with Teflon (registered trademark) agitator and sufficiently dried is charged 5.75 mmol of N,N'-dimethyl-1,6-diaminohexane under a stream of an inert gas, which is dissolved in 10 mL of tetrahydrofuran. Then, 5.75 mmol of n-butyllithium is added dropwise to the resulting solution while violently stirring with a magnetic stirrer. The solution is added with 5.75 mmol of chlorotrimethylsilane and stirred at room temperature for 30 minutes. After the resulting solid is filtered off through a PTFE filter, 15 mL of a filtrate is charged into a sufficiently dried pressure glass bottle of 150 mL, which is closely sealed with a crown cap provided with a rubber stopper. To this solution are successively added 4.23 mmol of tetramethylethylene diamine and 4.23 mmol of n-butyllithium, which are sufficiently stirred to obtain a polymerization initiator solution A.

Synthesis of Polymer A

Into a pressure glass vessel of 800 mL dried and purged with nitrogen are charged a cyclohexane solution of butadiene and a cyclohexane solution of styrene so as to be 60 g of butadiene monomer and 15 g of styrene monomer and then 11.7 mL of the above polymerization initiator solution A is added to conduct polymerization reaction at 50° C. for 2.5 hours. In this case, the conversion is approximately 100%. Thereafter, 0.5 mL of a solution of 2,6-di-t-butyl-p-cresol (BHT) in isopropanol (BHT concentration: 5% by mass) is added to the polymerization reaction system to stop the polymerization reaction, and further re-precipitated in an isopropanol solution containing slight amounts of hydrochloric acid and BHT, and then dried according to a usual manner to obtain a polymer A. With respect to the obtained polymer A, the number average molecular weight (Mn), molecular weight distribution (Mw/Mn) and Mooney viscosity $ML_{1+4}$ (100° C.) are measured by the following methods. The results are shown in Table 1.

(1) Number average molecular weight (Mn) and molecular weight distribution (Mw/Mn)

The number average molecular weight (Mn) and weight average molecular weight (Mw) of the polymer as converted to polystyrene are measured through a gel permeation chromatography [GPC: HLC-8020 made by Toso Co., Ltd. column: GMH-XL (two series columns) made by Toso Co., Ltd. detector: differential refractometer (RI)] as a standard of monodisperse polystyrene, and the molecular weight distribution (Mw/Mn) is calculated therefrom.

(2) Mooney viscosity $ML_{1+4}$ (100° C.)

The Mooney viscosity $ML_{1+4}$ (100° C.) of the polymer is measured at 100° C. by using a tester of RLM-01 model made by Toyo Seiki Co., Ltd.

Production Comparative Example 1

Synthesis of Polymer B

A polymer B is prepared in the same manner as in the synthesis of the polymer A except that 0.75 mmol of hexamethylene imine, 0.75 mmol of n-butyllithium (n-BuLi) and 0.75 mmol of ditetrahydrofuryl propane are successively added in stead of the addition of the polymerization initiator solution A. The analytical results of the obtained polymer B are shown in Table 1.

Production Comparative Example 2

Synthesis of Polymer C

Into a pressure glass vessel of 800 mL dried and purged with nitrogen are charged a cyclohexane solution of butadiene and a cyclohexane solution of styrene so as to be 60 g of butadiene monomer and 15 g of styrene monomer, and 0.75 mmol of ditetrahydrofuryl propane is added to the solution and further 0.75 mmol of n-butyllithium (n-BuLi) is added to conduct polymerization reaction at 50° C. for 1.5 hours. In this case, the conversion is approximately 100%. Then, 0.19 mmol of tin tetrachloride is added to the polymerization reaction system, and thereafter modification reaction is carried out at 50° C. for 30 minutes. Thereafter, 0.5 mL of a solution of 2,6-di-t-butyl-p-cresol (BHT) in isopropanol (BHT concentration: 5% by mass) is added to the polymerization reaction system to stop the polymerization reaction and further dried according to the usual manner to obtain a polymer C. The analytical results of the obtained polymer C are shown in Table 1.

Production Comparative Example 3

Synthesis of Polymer D

Into a pressure glass vessel of 800 mL dried and purged with nitrogen are charged a cyclohexane solution of butadiene and a cyclohexane solution of styrene so as to be 60 g of butadiene monomer and 15 g of styrene monomer, and 0.75 mmol of ditetrahydrofuryl propane is added to the solution and further 0.75 mmol of n-butyllithium (n-BuLi) is added to conduct polymerization reaction at 50° C. for 1.5 hours. In this case, the conversion is approximately 100%. Then, 0.5 mL of a solution of 2,6-di-t-butyl-p-cresol (BHT) in isopropanol (BHT concentration: 5% by mass) is added to the polymerization reaction system to stop the polymerization reaction and further dried according to the usual manner to obtain a polymer D. The analytical results of the obtained polymer D are shown in Table 1.

Production Example 2

Synthesis of Polymer E

A polymer E is synthesized in the same manner as in the synthesis of the polymer A except that 0.19 mmol of tin tetrachloride is added instead of the isopropanol solution of BHT and further the modification reaction is carried out at 50° C. for 30 minutes and thereafter the isopropanol solution of BHT is added.

Production Comparative Example 4

Synthesis of Polymer F

A polymer F is synthesized in the same manner as in the synthesis of the polymer B except that 0.19 mmol of tin tetrachloride is added instead of the isopropanol solution of BHT and further the modification reaction is carried out at 50° C. for 30 minutes and thereafter the isopropanol solution of BHT is added.

TABLE 1

|  | Mn | Mw/Mn | $ML_{1+4}$ (100° C.) |
|---|---|---|---|
| Polymer A | $174 \times 10^3$ | 1.20 | 22 |
| Polymer B | $195 \times 10^3$ | 1.08 | 28 |
| Polymer C | $382 \times 10^3$ | 1.68 | 80 |
| Polymer D | $211 \times 10^3$ | 1.04 | 24 |
| Polymer E | $319 \times 10^3$ | 1.87 | 76 |
| Polymer F | $357 \times 10^3$ | 1.71 | 74 |

Then, a rubber composition having a compounding recipe shown in Table 2 is prepared by using the above polymers A-F, and then the low loss factor of a vulcanized rubber obtained by vulcanizing the rubber composition at 160° C. for 15 minutes is measured by the following method. The results to the rubber composition of Compounding 1 are shown in Table 3, and the results to the rubber composition of Compounding 2 are shown in Table 4, and the results to the rubber composition of Compounding 3 are shown in Table 5.

(3) Low Loss Factor (Low Hest Buildup)

By using a viscoelasticity measuring apparatus made by Rheometric Corporation is measured tan δ under conditions of temperature: 50° C., frequency: 15 Hz and strain: 3% or 10%, which is represented by an index on the basis that tan δ of the rubber composition of Comparative Example 3 is 100 in the rubber composition of Compounding 1 and tan δ of the rubber composition of Comparative Example 7 is 100 in the rubber composition of Compounding 2 and tan δ of the rubber composition of Comparative Example 11 is 100 in the rubber composition of Compounding 3. The smaller the index value, the better the low heat buildup.

TABLE 2

| | Compounding 1 | Compounding 2 | (parts by mass) Compounding 3 |
|---|---|---|---|
| SBR *1 | 80 | 80 | 80 |
| Natural rubber | 20 | 20 | 20 |
| Carbon black HAF | 50 | 27 | — |
| Silica *2 | — | 27 | 55 |
| Aromatic oil | 10 | 10 | 10 |
| Stearic acid | 2 | 2 | 2 |
| Antioxidant 6C *3 | 1 | 1 | 1 |
| Silane coupling agent *4 | — | 2.5 | 5 |
| Zinc oxide | 2.5 | 2.5 | 2.5 |
| Vulcanization accelerator D-G *5 | 0.3 | 0.7 | 1.4 |
| Vulcanization accelerator DM-P *6 | 0.5 | 1.2 | 2 |
| Vulcanization accelerator NS-P *7 | 0.5 | 0.6 | 0.7 |
| Sulfur | 1.5 | 1.5 | 1.5 |

*1: Polymers A-F produced in Production Examples 1-2 and Production Comparative Examples 1-4, in which the kinds of the polymers used are shown in Tables 3-5.
*2: Nipsil AQ, made by Nippon Silica Kogyo Co., Ltd.
*3: N-(1,3-dimethylbutyl)-N'-phenyl-p-phenylene diamine, Nocrac 6C made by Ohuchi Shinko Kagaku Co., Ltd.
*4: bis(3-triethoxysilylpropyl)tetrasulfide, silane coupling agent Si69 made by Degussa
*5: N,N'-diphenyl guanidine, Suncelar D-G made by Sanshin Kagaku Kogyo Co., Ltd.
*6: dibenzothiazyl disulfide, Noccekar DM-P made by Ohuchi Shinko Kagaku Co., Ltd.
*7: N-t-butyl-2-benzothiazyl sulfenamide, Noccekar NS-P made by Ohuchi Shinko Kagaku Co., Ltd.

TABLE 3

| | Example 1 | Comparative Example 1 | Comparative Example 2 | Comparative Example 3 | Example 2 | Comparative Example 4 |
|---|---|---|---|---|---|---|
| SBR used | Polymer A | Polymer B | Polymer C | Polymer D | Polymer E | Polymer F |
| tan δ (3%, 50° C.) (index) | 69 | 87 | 73 | 100 | 54 | 65 |

* The compounding of the rubber composition is corresponds to Compounding 1 in Table 2 (including carbon black).

TABLE 4

| | Example 3 | Comparative Example 5 | Comparative Example 6 | Comparative Example 7 | Example 4 | Comparative Example 8 |
|---|---|---|---|---|---|---|
| SBR used | Polymer A | Polymer B | Polymer C | Polymer D | Polymer E | Polymer F |
| tan δ (3%, 50° C.) (index) | 76 | 89 | 81 | 100 | 62 | 74 |

* The compounding of the rubber composition is corresponds to Compounding 2 in Table 2 (including carbon black and silica).

TABLE 5

| | Example 5 | Comparative Example 9 | Comparative Example 10 | Comparative Example 11 | Example 6 | Comparative Example 12 |
|---|---|---|---|---|---|---|
| SBR used | Polymer A | Polymer B | Polymer C | Polymer D | Polymer E | Polymer F |
| tan δ (3%, 50° C.) (index) | 81 | 97 | 95 | 100 | 78 | 95 |

* The compounding of the rubber composition is corresponds to Compounding 3 in Table 2 (including silica).

As seen from the above results, the rubber compositions of the examples including the modified conjugated diene polymer according to the invention are excellent in the low heat buildup even in any compoundings of Compounding 1 using carbon black as a filler, Compounding 2 using carbon black and silica as a filler and Compounding 3 using silica as a filler. On the other hand, when using the polymer B wherein the cyclic amino group is introduced into the polymerization staring terminal and the polymer C wherein the polymerization active terminal is coupled with the tin compound, the low heat buildup can be improved as compared with the non-modified polymer D, but the improving width is small. By combining the modifying polymerization initiator according to the invention and a proper terminal modifying agent are obtained rubber compositions being more excellent in the low heat buildup.

The invention claimed is:

1. A modified conjugated diene polymer comprising a homopolymer of a conjugated diene compound or a copolymer of a conjugated diene compound and an aromatic vinyl compound and characterized by the following formula (I):

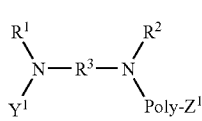

wherein $R^1$ and $R^2$ are independently an alkyl or aryl group having a carbon number of 1-20, a substituted silyl group or a hydrogen atom; $R^3$ is an alkylene or arylene group having a carbon number of 1-12 provided that it may include a hetero atom provided that it does not have an active proton; $Y^1$ is a substituted silyl group or a hydrogen atom; a part of $R^1$, $R^2$, $R^3$ and $Y^1$ may be bonded to each other to form a cyclic structure; Poly is a homopolymer part of a conjugated diene compound or a copolymer portion of a conjugated diene compound and an aromatic vinyl compound; $Z^1$ is an alkali metal, an alkaline earth metal salt or an alkaline earth metal alkyl group, or a residue produced by reacting with a carbanion reactive compound, or a hydrogen atom provided that when $Z^1$ is an alkali metal, an alkaline earth metal salt or an alkaline earth metal alkyl group, none of $R^1$, $R^2$ and $Y^1$ is the hydrogen atom.

2. A modified conjugated diene polymer according to claim 1, wherein $R^2$ in the formula (I) is an alkyl or aryl group having a carbon number of 1-20.

3. A modified conjugated diene polymer according to claim 1, wherein the conjugated diene compound is 1,3-butadiene or isoprene.

4. A modified conjugated diene polymer according to claim 1, wherein the aromatic vinyl compound is styrene.

5. A modified conjugated diene polymer according to claim 1, wherein said polymer is a copolymer of the conjugated diene compound and the aromatic vinyl compound.

6. A modified conjugated diene polymer according to claim 1, wherein said polymer has a Mooney viscosity $ML_{1+4}$ (100° C.) of 10-150.

7. A modified conjugated diene polymer according to claim 1, characterized by the further modification of a modified conjugated diene polymer wherein $Y^1$ in the formula (I) is a hydrogen atom with at least one of a compound having an isocyanate group and a condensate thereof.

8. A modified conjugated diene polymer according to claim 1, wherein said polymer is a modified conjugated diene polymer obtained by modifying a modified conjugated diene polymer wherein $Z^1$ in the formula (I) is an alkali metal, an alkaline earth metal salt or an alkaline earth metal alkyl group with a carbanion reactive compound, in which $Z^1$ in the formula (I) is a residue produced by reacting with the carbanion reactive compound.

9. A modified conjugated diene polymer according to claim 8, characterized by the further modification of a modified conjugated diene polymer wherein $Y^1$ in the formula (I) is a hydrogen atom with at least one of a compound having an isocyanate group and a condensate thereof.

10. A modified conjugated diene polymer according to claim 8, wherein the carbanion reactive compound used in the modification is a compound including at least one of C=X (X is O, S or C) and an epoxy group as a carbanion reaction site and a nitrogen-containing functional group, a silicon-containing compound, or a tin-containing compound.

11. A modified conjugated diene polymer according to claim 10, wherein the carbanion reactive compound used in the modification is at least one selected from the group consisting of 4-dimethylamino benzophenone, 4-diethylamino benzophenone, 4,4'-bis(dimethylamino)benzophenone, 4,4'-bis(diethylamino)benzophenone, 4-dimethylamino benzaldehyde, 4-diethylamino benzaldehyde, 1,1-bis(4-dimethylaminophenyl)ethylene, 1,1-bis(4-diethylaminophenyl)ethylene, 1,1-dimethoxy trimethylamine, 4-dimethylaminobenzylidene aniline, N,N-dimethylformamide, N,N-diethylformamide, N,N-dimethylacetamide, N,N-diethylacetamide, 4-pyridylamide, 4-pyridyl-ethyl-eneoxide, 4-vinylpyridine, 2-vinylpyridine, dicyclohexyl carbodiimide, s-caprolactam, N-methyl-ϵ-caprolactam, 1,3-dimethyl-2-imidazolidinone, N-methylpyrrolidone, phenylisocyanate, phenylthioisocyanate and diisocyanate diphenylmethane.

12. A modified conjugated diene polymer according to claim 10, wherein the carbanion reactive compound used in the modification is a coupling agent represented by the following formula (II):

wherein $R^4$ is independently selected from an alkyl group having a carbon number of 1-20, a cycloalkyl group having a carbon number of 3-20, an aryl group having a carbon number of 6-20 and an aralkyl group having a carbon number of 7-20; $Z^2$ is tin or silicon atom; $X^1$ is independently chlorine or bromine atom; and a is an integer of 0-3 and b is an integer of 1-4 provided that a+b=4.

13. A modified conjugated diene polymer according to claim 10, wherein the carbanion reactive compound used in the modification is at least one selected from the group consisting of a hydrocarbyloxysilane compound represented by the following formula (III):

wherein $A^1$ is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid, carbonic acid dihydrocarbylester, cyclic tertiary amine, non-cyclic tertiary amine, nitrile, pyridine, sulfide, multi-sulfide, an alkali metal salt of amine, al alkaline earth metal salt of amine, silazane and disilazane; $R^5$ is a single bond or a divalent inactive hydrocarbon group; $R^6$ and $R^7$ are independently a monovalent aliphatic hydrocarbon group having a carbon number of 1-20 or a monovalent aromatic hydrocarbon group having a carbon number of 6-18; n is an integer of 0-2; when plural $OR^7$s are existent, these $OR^7$s may be same or different; active protons and onium salts are not included in the carbanion reactive compound; and/or a partial condensate thereof, and a hydrocarbyloxysilane compound represented by the following formula (IV):

  (IV)

wherein $R^8$ and $R^9$ are independently a monovalent aliphatic hydrocarbon group having a carbon number of 1-20 or a monovalent aromatic hydrocarbon group having a carbon number of 6-18; p is an integer of 0-2; when plural $OR^9$s are existent, these $OR^9$s may be same or different; active proton and onium salt is not included in the molecule; and/or a partial condensate thereof.

14. A polymerization initiator characterized by the following formula (V):

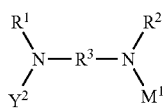  (V)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure; $M^1$ is an alkali metal, an alkaline earth metal salt or an alkaline earth metal alkyl group.

15. A polymerization initiator solution resulting from the addition of a diamine compound represented by the following formula (VI):

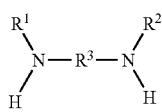  (VI)

wherein $R^1$ and $R^2$ are independently an alkyl or aryl group having a carbon number of 1-20 or a hydrogen atom; $R^3$ is an alkylene or arylene group having a carbon number of 1-12 provided that it may include a hetero atom provided that it has does not have an active proton; a part of $R^1$, $R^2$ and $R^3$ may be bonded to each other to form a cyclic structure, with a silyl compound represented by the following formula (VII):

  (VII)

wherein $Y^2$ is a substituted silyl group; $X^2$ is one selected from the group consisting of a halogen atom, a thioalkyl group having a carbon number of 1-20, cyano group and trifluoromethylsulfonyl group, and the subsequent addition of an organic alkali metal compound or an organic alkaline earth metal compound thereto.

16. A method of producing a polymerization initiator, characterized in that (i) a diamine compound represented by the following formula (VI):

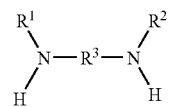  (VI)

wherein $R^1$ and $R^2$ are independently an alkyl or aryl group having a carbon number of 1-20 or a hydrogen atom; $R^3$ is an alkylene or arylene group having a carbon number of 1-12 provided that it may include a hetero atom provided that it does not have an active proton; a part of $R^1$, $R^2$ and $R^3$ may be bonded to each other to form a cyclic structure, is added with a silyl compound of represented by the following formula (VII):

  (VII)

wherein $Y^2$ is a substituted silyl group; $X^2$ is one selected from the group consisting of a halogen atom, a thioalkyl group having a carbon number of 1-20, cyano group and trifluoromethylsulfonyl group, to form a silylated diamine compound represented by the following formula (VIII):

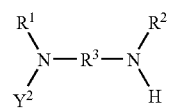  (VIII)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure; and (ii) the said silylated diamine compound is added with an organic alkali metal compound or an organic alkaline earth metal compound to form a polymerization initiator represented by the following formula (V)

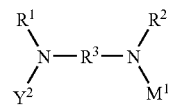  (V)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure; $M^1$ is an alkali metal, an alkaline earth metal salt or an alkaline earth metal alkyl group.

17. A method of producing a polymerization initiator according to claim 16, whereinn $X^2$ in the formula (VII) is a halogen atom.

18. A method of producing a modified conjugated diene polymer, characterized in that (i) a diamine compound represented by the formula (VI):

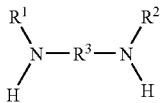
(VI)

wherein $R^1$ and $R^2$ are independently an alkyl or aryl group having a carbon number of 1-20 or a hydrogen atom; $R^3$ is an alkylene or arylene group having a carbon number of 1-12 provided that it may include a hereto atom provided that it does not have an active proton; a part of $R^1$, $R^2$ and $R^3$ may be bonded to each other to form a cyclic structure, is added with a silyl compound represented by the following formula (VII):

(VII)

wherein $Y^2$ is a substituted silyl group; $X^2$ is one selected from the group consisting of a halogen atom, a thioalkyl group having a carbon number of 1-20, cyano group and trifluoromethylsulfonyl group, to form a silylated diamine compound represented by the following formula (VIII);

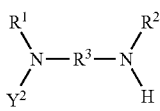
(VIII)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure;

(ii) the silylated diamine compound is added with an organic alkali metal compound or the organic alkaline earth metal compound to form the polymerization initiator represented by the following formula (V);

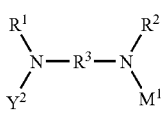
(V)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure; $M^1$ is an alkali metal, an alkaline earth metal salt or an alkaline earth metal alkyl group, and (iii) the polymerization initiator is used to polymerize a conjugated diene compound or polymerize a conjugated diene compound and aromatic vinyl compound.

19. A modified conjugated diene polymer obtained by using a polymerization initiator solution as claimed in claim 15 and polymerizing a conjugated diene compound or a conjugated diene compound and an aromatic vinyl compound.

20. A method of producing a modified conjugated diene polymer, characterized in that (i) a diamine compound represented by the following formula (VI):

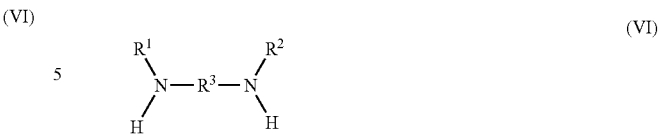
(VI)

wherein $R^1$ and $R^2$ are independently an alkyl or aryl group having a carbon number of 1-20 or a hydrogen atom; $R^3$ is having a carbon number of 1-12 provided that it may include a hereto atom provided that it does not have an active proton; a part of $R^1$, $R^2$ and $R^3$ may be bonded to each other to form a cyclic structure, is added with a silyl compound represented by the following formula (VII):

(VII)

wherein $Y^2$ is a substituted silyl group; $X^2$ is one selected from the group consisting of a halogen atom, a thioalkyl group having a carbon number of 1-20, cyano group and trifluoromethylsulfonyl group, to form a silylated diamine compound represented by the following formula (VIII);

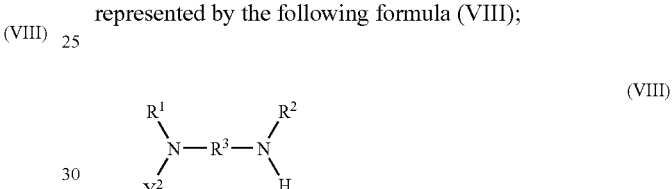
(VIII)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure;

(ii) the silylated diamine compound is added with an organic alkali metal compound or the organic alkaline earth metal compound to form the polymerization initiator of the formula (V):

(V)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure; $M^1$ is an alkali metal, an alkaline earth metal salt or an alkaline earth metal alkyl group;

(iii) the polymerization initiator is added to a solution containing a conjugated diene compound to produce a low molecular weight polymer represented by the following formula (IX):

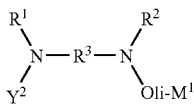
(IX)

wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group $M^1$ is an alkali metal, an alkaline earth metal salt or an alkaline earth metal alkyl group; a part of $R^1$, $R^2$, $R^3$ and $Y^2$ may be bonded to each other to form a cyclic structure; Oli is an oligomer or polymer portion formed by polymerizing 3-300 conjugated diene compounds; and (iv) the low molecular weight polymer is added to a solution containing a conjugated diene compound or a solution containing a conjugated diene compound and an aromatic vinyl compound.

21. A method of producing a modified conjugated diene polymer, characterized in that (i) a diamine compound represented by the following formula (VI):

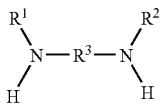
(VI)

(wherein $R^1$ and $R^2$ are independently an alkyl or aryl group having a carbon number of 1-20 or a hydrogen atom; $R^3$ is an alkylene or arylene group having a carbon number of 1-12 provided that it may include a hereto atom provided that it does not have an active proton; a part of $R^1$, $R^2$ and $R^3$ may be bonded to each other to form a cyclic structure) is added with a silyl compound represented by the following formula (VII):

$$Y^2-X^2 \quad \text{(VII)}$$

(wherein $Y^2$ is a substituted silyl group; $X^2$ is one selected from the group consisting of a halogen atom, a thioalkyl group having a carbon number of 1-20, cyano group and trifluoromethylsulfonyl group) to form a silylated diamine compound represented by following formula (VIII):

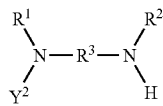
(VIII)

(wherein $R^1$ and $R^2$ are independently an alkyl or aryl group having a carbon number of 1-20 or a substituted silyl group; $R^3$ is an alkylene or arylene group having a carbon number of 1-12 provided that it may include a hetero atom provided that it has does not have an active proton; $Y^2$ is a substituted silyl group; a part of $R^1$, $R^2$, $R^3$ and $Y^2$ may be bonded to each other to form a cyclic structure);

(ii) the silylated diamine compound is added to a solution containing a conjugated diene compound or a solution containing a conjugated diene compound and an aromatic vinyl compound; and (iii) the solution is further added with an organic alkali metal compound or an organic alkaline earth metal compound.

22. A rubber composition characterized as including a modified conjugated diene polymer as claimed in claim 1 as a rubber component.

23. A rubber composition according to claim 22, wherein a content of the modified conjugated diene polymer is not less than 10% by mass in the rubber component.

24. A rubber composition according to claim 22, which is sulfur-crosslinking.

25. A rubber composition according to claim 22, which is compounded with 10-100 parts by mass in total of carbon black and/or an inorganic filler per 100 parts by mass of the rubber component.

26. A rubber composition according to claim 25, wherein 10-100 parts by mass of silica as the inorganic filler is compounded per 100 parts by mass of the rubber component.

* * * * *